United States Patent [19]
Via

[11] Patent Number: 5,860,319
[45] Date of Patent: *Jan. 19, 1999

[54] REDUCED NOISE DRIVE BLOCK FOR VEHICLE SEAT ADJUSTER

[75] Inventor: Michael D. Via, Ortonville, Mich.

[73] Assignee: Lear Corporation, Southfield, Mich.

[ * ] Notice: The term of this patent shall not extend beyond the expiration date of Pat. No. 5,769,377.

[21] Appl. No.: 770,047

[22] Filed: Dec. 19, 1996

[51] Int. Cl.$^6$ .................................................. F16H 25/06
[52] U.S. Cl. .................................... 74/89.15; 74/424.8 R; 248/429
[58] Field of Search .................... 74/89.15, 89, 424.8 R; 248/459, 424

[56] References Cited

U.S. PATENT DOCUMENTS

| | | |
|---|---|---|
| 2,929,439 | 3/1960 | Tanaka et al. . |
| 3,043,552 | 7/1962 | Colautti . |
| 3,457,234 | 7/1969 | Gianatasio . |
| 3,617,021 | 11/1971 | Littmann . |
| 4,015,812 | 4/1977 | Heesch . |
| 4,274,293 | 6/1981 | Ruger . |
| 4,432,583 | 2/1984 | Russo et al. . |
| 4,794,810 | 1/1989 | Parsons . |
| 4,802,374 | 2/1989 | Hamelin et al. . |
| 4,872,903 | 10/1989 | Periou . |
| 4,939,945 | 7/1990 | Ryder et al. . |
| 4,949,585 | 8/1990 | Dauvegme et al. . |
| 5,014,958 | 5/1991 | Harney . |
| 5,048,786 | 9/1991 | Tanaka et al. . |
| 5,048,886 | 9/1991 | Ito et al. . |
| 5,172,601 | 12/1992 | Siegrist et al. . |
| 5,207,473 | 5/1993 | Nawa et al. . |
| 5,316,258 | 5/1994 | Gauger et al. . |
| 5,349,878 | 9/1994 | White et al. . |
| 5,393,028 | 2/1995 | Satoh et al. .............................. 248/429 |
| 5,445,354 | 8/1995 | Gauger et al. . |
| 5,456,439 | 10/1995 | Gauger et al. . |
| 5,467,957 | 11/1995 | Gauger . |
| 5,473,958 | 12/1995 | Jeck et al. . |
| 5,507,552 | 4/1996 | Inetch et al. . |
| 5,638,925 | 6/1997 | Neumueller et al. .............. 74/89.15 X |
| 5,711,184 | 1/1998 | Pryor et al. ............................ 74/89.15 |

FOREIGN PATENT DOCUMENTS

| | | |
|---|---|---|
| 3724038 | 2/1989 | Germany . |
| 2260898 | 5/1993 | United Kingdom . |

*Primary Examiner*—Charles A. Marmor
*Assistant Examiner*—David Fenstermacher
*Attorney, Agent, or Firm*—Young & Basile, PC.

[57] ABSTRACT

A drive apparatus suitable for a power seat adjuster includes a rotatably threaded shaft disposed between an upper track movably mounted with respect to a stationary lower track. Coaxial apertures are formed in opposed side legs of a housing fixed to the lower track. A drive block having a bore threadingly engaged with the threaded shaft is disposed in the housing and in coaxial alignment with apertures in two side legs of the housing. A resilient cushion fills the housing and surrounds the drive block to vibrationally isolate the drive block from the housing and the lower track.

10 Claims, 3 Drawing Sheets

REDUCED NOISE DRIVE BLOCK FOR VEHICLE SEAT ADJUSTER

CROSS REFERENCE TO RELATED APPLICATIONS

The present invention is related to inventions disclosed in co-pending U.S. patent application Ser. No. 08/552,878 filed Nov. 3, 1995, entitled Gimballed Drive Block For Vehicle Seat Adjuster and co-pending U.S. patent application Ser. No. 08/656,985 filed Jun. 6, 1996 and entitled Self-Aligning Drive Nut For Vehicle Power Seat Adjuster.

BACKGROUND OF THE INVENTION

1. Field of the Invention

The present invention relates, in general, to vehicle seat adjusters.

2. Description of the Art

Power seat adjusters are a popular option on many automotive vehicles and are frequently offered as standard equipment on higher priced vehicles. Such power seat adjusters are primarily used on the driver's seat and, sometimes, on the front passenger seat of the vehicle to provide selective horizontal fore and aft and vertical movement of the seat as well as seat back recliner movement to accommodate occupants of different size and height as well as to provide a comfortable seating position to suit each occupant's preference.

Such power seat adjusters typically carry a seat support frame which supports the seat bottom and sometimes the seat back of a vehicle seat. The seat support frame is mounted on first and second, spaced track assemblies, each formed of an upper track which is connected to the seat support frame and which is slidably mounted on a lower track anchored to the vehicle floor. A drive mechanism typically includes a electric motor which bi-directionally rotates a pair of drive shafts extending outward from the motor to a gear assembly or box mounted on each upper track. In one arrangement, each gear box rotates a lead screw extending longitudinally below and carried by each upper track. A drive block is fixedly mounted to each lower track and threadingly receives the lead screw to cause reciprocal, horizontal movement of the upper track and the attached seat support frame relative to the lower track which is fixed to the vehicle upon selective energization of the drive motor and the drive shafts.

Similar drive mechanisms are provided for vertical (up and down) adjustment of the seat support frame and, in a seat adjuster having a seat recliner adjustment mechanism, for angularly adjusting the position of the seat back with respect to the seat bottom. The vertical drive mechanism may also include separate front and rear edge seat adjustment drive mechanisms for selectively tilting the front and rear edges of the seat bottom independent of each other as well as simultaneously to raise and lower the entire vehicle seat or, in some applications, only the seat bottom or cushion.

However, the rigid connection between the gears in the gear assembly, the drive motor output shaft, the drive shaft, the lead screw and the drive block frequently leads to problems during assembly and operation of a vehicle power seat adjuster. It is inevitable in the manufacture and assembly of a mechanical mechanism, such as a power seat adjuster, that poor dimensional conditions, such as concentricity, TIR, and linear discrepancies from nominal design dimensions, can and typically do occur. These dimensional conditions, without correction, can cause various problems in the operation of a power seat adjuster, such as poor breakaway from a stop position, slow operation of the power seat adjuster in extreme temperatures, excessive wear of the components of the power seat adjuster, uneven operation of the power seat adjuster, and the generation of unpleasant sounds or squeal during the operation of the power seat adjuster. One primary source of such objectionable noise or squeal is the rotation of the metal lead screw in the metal drive block.

To address certain of these problems, power seat adjusters have been devised in which the drive block is rotatably mounted in a aperture in the lower track for rotation about an axis extending longitudinally through the drive block and perpendicular to the lower track as shown in U.S. Pat. No. 5,467,957. Such rotation of the drive block is achieved by freely mounting the drive block in the aperture in the lower track without any additional fasteners, or by using a fastener with an enlarged head. In this latter structure, a cylindrical mounting collar or boss extends from the drive block through the aperture in the lower track and receives the fastener in an internal threaded bore. The mounting collar has a length than the thickness of the lower track to provide a small amount of vertical play between the drive block and the lower track to permit rotation of the drive block in the aperture in the lower track. Such rotatable drive blocks accommodate variations in end-to-end alignment of the lead screw and the lower track.

It is also known to provide other drive blocks or bearing blocks used in a power seat adjuster to connect the drive shaft to a lead screw and/or to connect the lead screw to a seat block recliner linkage with freedom of movement about two mutually exclusive axes. In this structure, the drive block or bearing block is provided with a pair of outwardly extending legs which ride in slots in a support bracket to enable rotation of the drive or bearing block about an axis extending through the legs. The side walls of the bracket carrying the slots is also formed slightly wider than the drive or bearing block to provide a small amount of lateral translation of the drive or bearing block in the bracket.

While the above-described vehicle seat adjuster drive blocks have proven effective in so far as providing self-alignment to overcome tolerance build up and misalignment conditions, it would still be desirable to provide a drive block for a vehicle seat adjuster which reduces the noise generated by rotation of the lead screw within the drive block. It would also be desirable to provide a drive block which can conform to all alignment positions of the lead screw relative to a lower track or other component of a vehicle seat adjuster. It would also be desirable to provide such a drive block which does not require major modification of the vehicle seat adjuster components.

SUMMARY OF THE INVENTION

The present invention is a reduced noise drive block particularly suited for use in a vehicle power seat adjuster. In a general application for a drive apparatus which includes a first member moveable with respect to a stationary second member, and a threaded shaft extending between the first and second members, a housing is fixedly mounted to the second member and includes coaxial apertures. A drive block having an internally threaded bore threadingly engageble with the threaded shaft is disposed within the housing with the bore in coaxial alignment with the coaxial apertures in the housing. Cushion means fills the housing and surrounds the drive block for vibrationally isolating the drive block from the housing and the second member.

In a preferred embodiment, the housing has a bottom wall fixedly mountable to the second member and opposed side legs, each carrying one of the coaxial apertures. The apertures preferably have a larger diameter than the threaded shaft; but a smaller diameter than the outer diameter of the drive block.

The cushion means preferably comprises a resilient, moldable cushion material which fills the housing and surrounds the drive block.

The reduced noise drive block of the present invention finds particular advantageous use in a vehicle power seat adjuster. In this application, the cushion material surrounding the drive block vibrationally isolates the drive block from the housing and the attached lower track thereby substantially reducing any noise propagation through the track assembly previously caused by rotation of the metal threaded shaft in the metal drive block. The cushion material also provides a degree of resiliency so as to allow a small amount of vertical, lateral or horizontal movement of the drive block within the housing to accommodate any misalignment or tolerance build-up between the housing, the drive block and the lower track.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
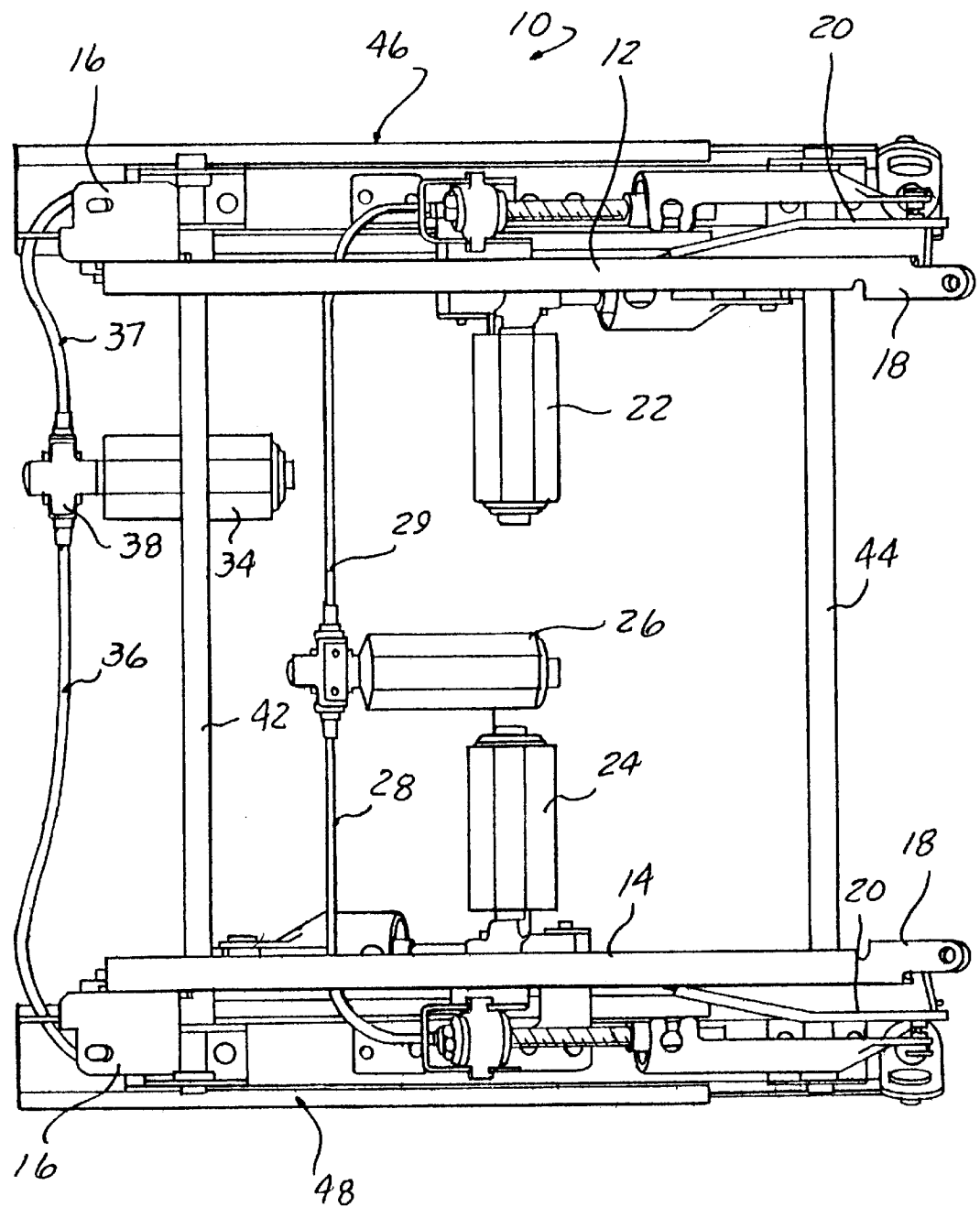
FIG. 1 is a plan view of a vehicle power seat adjuster incorporating a drive block according to the present invention.
Figure 2:
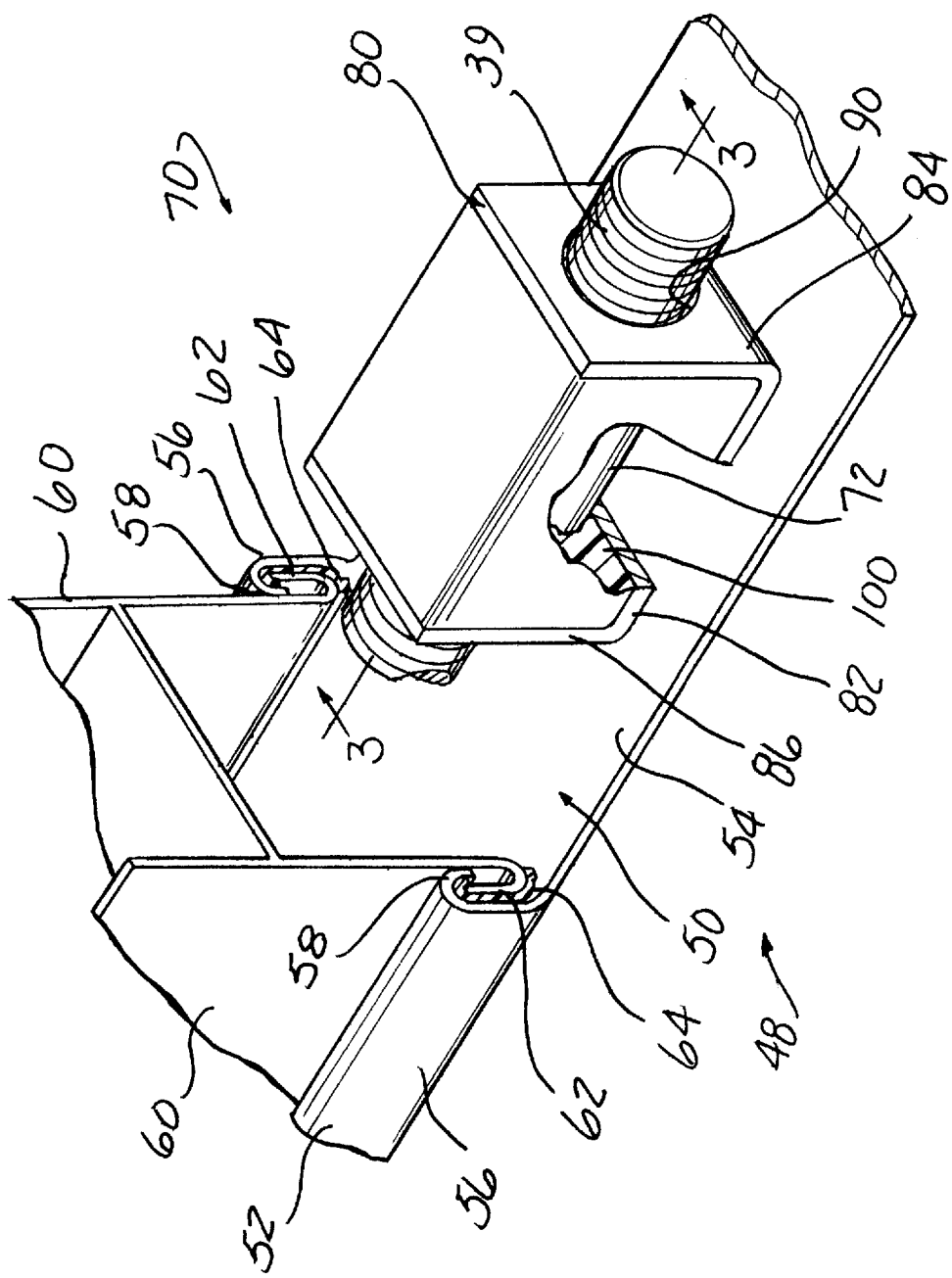
FIG. 2 is a partial, perspective view of one track assembly of the vehicle seat adjuster shown in FIG. 1 and depicting the drive block of the present invention.

Referring now to the drawing, and to FIGS. 1 and 2 in particular, there is illustrated a conventional, prior art power seat adjuster 10 which variably positions an automotive vehicle seat in any occupant selected position. The power seat adjuster 10 is a so-called "eight-way" adjuster providing horizontal fore/aft, vertical up and down, independent movement of each of the front and rear edges of the adjuster, as well as pivotal tilting of the seat back with respect to the seat bottom. It will be understood, however, that the present invention described hereafter is employable with a power seat adjuster which includes at least one of such movements or adjustments, such as a horizontal fore/aft movement by itself or in combination with any number of the other such movements described above, each of which can also be used separately. The present invention is also useable with a manual seat adjuster.

As is conventional, the power seat adjuster 10 supports a conventional vehicle seat, not shown, which includes a seat bottom or cushion and a seat back. An upper seat support frame is provided on the power seat adjuster 10 for supporting and connecting the seat bottom and the seat back to the power seat adjuster 10. The upper seat support frame includes a pair of spaced, longitudinally extending frame members or rails 12 and 14. Mounting brackets 16 are mounted on the front end and a mounting surface 18 is formed at the rear end of the frame members 12 and 14 to for connecting the seat bottom to the upper support frame. It will be understood that in lieu of the seat support frame members 12 and 14, suitable mounting brackets may be provided on the power seat adjuster 10 for direct attachment of a seat bottom of a vehicle seat to the power seat adjuster 10. A seat back pivot bracket 20 is mounted on each of the seat support frame members 12 and 14 to provide a pivot connection to the seat back, not shown, and to permit selective tilting or pivotal movement of the seat back with respect to the seat bottom as is typical in so-called "seat recliners".

Various drive assemblies are mounted on the power seat adjuster 10 to provide selective movement of various components of the power seat adjuster along various axes. For example, front and rear vertical drive motors 22 and 24, respectively, are mounted on the power seat adjuster 10 and connected to conventional lead screws and drive blocks or nuts to independently elevate front and rear edges of the seat support frame members 12 and 14, respectively, and, thereby, to provide selective vertical adjustment of the front and rear edges of the vehicle seat. In addition, a seat back recliner drive motor 26 drives a pair of rotatable drive shafts 28 and 29, which are coupled to individual lead screws. Each lead screw is connected by a drive link to one of the seat back pivot brackets 20 mounted on opposite sides of the power seat adjuster 10 to provide selective pivotal adjustment of the seat back with respect to the seat bottom of a vehicle seat mounted on the seat support frame members 12 and 14.

The power seat adjuster 10 also includes a horizontal drive means formed of an electric motor 34 which is fixedly mounted to one of the upper tracks of the power seat adjuster 10 by means of a suitable bracket, not shown. A pair of bi-directional rotatable drive shafts 36 and 37 extend outward from a gear assembly or box 38 integrally connected to the output shaft of the drive motor 34 to a rotatable connection with a lead screw 39 disposed in each of a pair of opposed track assemblies as described hereafter.

The power seat adjuster 10 also optionally includes front and rear tubular torsion tubes or rods 42 and 44, respectively, which extend between and are connected to opposed track assemblies denoted generally by reference numbers 46 and 48 to provide a rigid support structure for the power seat adjuster 10.

As each of the track assemblies 46 and 48 is identically constructed, the following description will be provided for only track assembly 48. It will be understood that the opposite track assembly 46 is constructed in the same manner. As shown in FIGS. 1 and 2 the track assembly 48 includes a lower track 50 and an upper track 52. The upper track 52 is slidably disposed within the lower track 50 and is reciprocatingly bi-directionally movable along the lower track 50 under the control of the horizontal drive means.

Further, as shown in FIG. 1, each torsion tube 42 and 44 is rotatably mounted in suitable mounting brackets which are fixed to opposite ends of each upper track 52. A fastener, not shown, such as a conventional push nut, is mounted on the outer end of each torsion tube 42 and 44 to securely retain each torsion tube 42 and 44 in the associated mounting bracket.

As described above, the electric horizontal drive motor 34 is mounted by a suitable bracket or other mounting members to the upper tracks 52 of the power seat adjuster 10 and typically located between the track assemblies 46 and 48 as shown in FIG. 1. The motor 34 has a rotatable output shaft, which rotates in either of two directions depending upon the selective mode of energization of the motor 34. The gear means 38 in the form of a gear box or gear assembly is integrally formed as part of the motor 34 and is connected to the output shaft of the motor 34. The gear means 38 functions to convert rotation of the output shaft of the motor 34 to rotation of the two horizontal drive shafts 36 and 37. The gear means 38 may also be mounted separate from the motor 34 while still being coupled to the output shaft 35 of the motor 34. A suitable gear reduction may be implemented by the gear means 38 so as to provide a low speed of rotation with high torque to the drive shafts 36 and 37.

Instead of a motor having a rotatable output shaft, the horizontal, vertical and/or recliner drive mechanisms may use a motor driven linear actuator which translates an output shaft in either direction.

FIG. 2 depicts a portion of one of the two vehicle track assemblies found in a conventional vehicle seat adjuster. The track assembly 48 includes a lower track 50 which is fixed by suitable mounting brackets in a stationary position on the vehicle floor. The lower track 10 includes a generally planar base 54 having a pair of upstanding side walls 56 on opposite sides thereof. The side walls 56 smoothly curve into and terminate in downwardly extending inner flanges 58. The inner flanges 58 are spaced from the side walls 56 to define a slot therebetween which extends longitudinally along the lower track 50.

Figure 3:
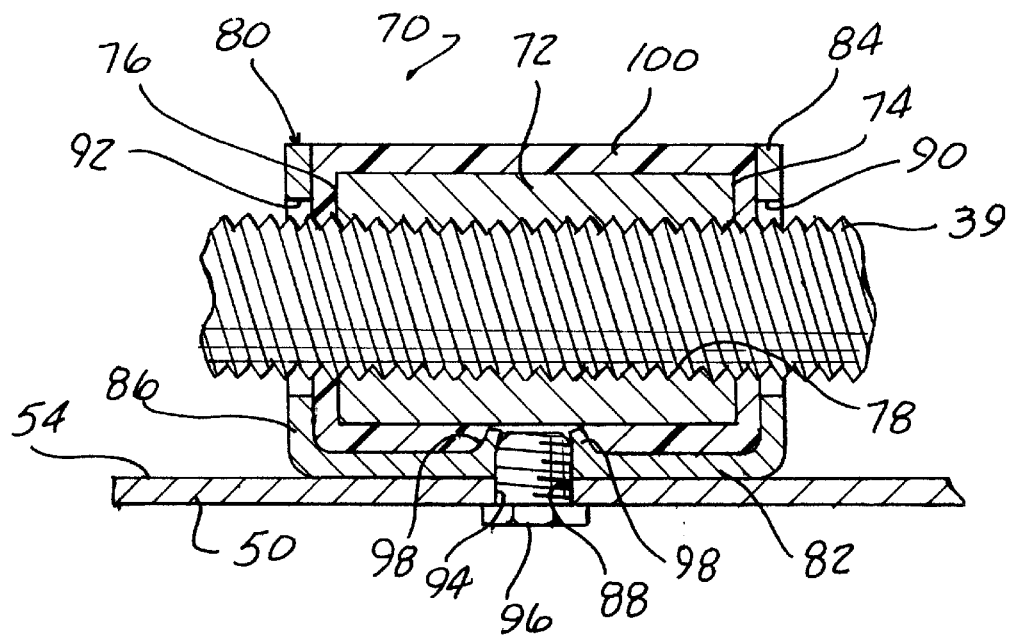
FIG. 3 is a cross sectional view generally taken along line 3—3 in FIG. 2.

At least one and preferably a pair of laterally spaced apertures 60, only one aperture 60 shown in FIG. 3, are formed in the base 54 of the lower track 50.

The upper track 52 may take any one of a number of different configurations. By way of example only, the upper track 52 is formed of a pair of vertically extending side walls 60, the lower ends of which curve outwardly and upwardly to form end flanges 62. The end flanges 62 are disposed in the slot formed between the inner flange 58 and the side walls 56 of the lower track 50.

A low friction slide member 64 is disposed between the facing surfaces of the flanges 62 of the upper track 52 and the side walls 56 and the inner flanges 58 of the lower track 50 to facilitate easy sliding movement of the upper track 52 relative to the stationarily fixed lower track 50.

Figure 4:
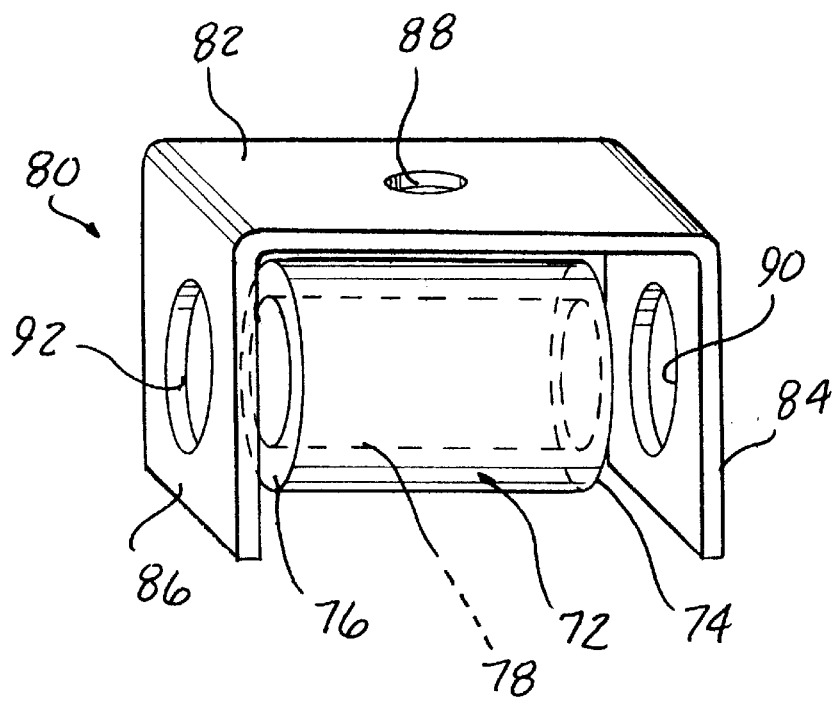
FIG. 4 is a perspective view of the drive block and drive block housing.

Referring now to FIGS. 2–4, there is depicted a drive block assembly 70 which adapted to be fixedly mounted to the base 54 of the lower track 50. The drive block assembly 70 includes a generally cylindrical drive block 72 preferably formed of a high strength metal, such as steel. The drive block 74 has first and second opposed ends 74 and 76. Further, the drive block 72 has an internal threaded bore 78 with a diameter to threadingly engage the threaded lead screw or drive shaft 39 as shown in FIGS. 2 and 3.

The drive block assembly 70 also includes a housing 80. It should be noted that housing 80 is depicted in its normal mounting position on the lower track 50 in FIGS. 2 and 3. FIG. 4 depicts the housing 80 in a 180° inverted position for clarity in depicting all features of the housing 80. FIG. 4 also depicts the housing 80 and drive block 72 without any resilient material as described hereafter.

The housing 80 has a generally three sided configuration, by way of example only. Thus, the housing 80 includes a bottom wall 82 and first and second opposed side walls 84 and 86. The side walls 84 and 86 are generally parallel and spaced from the first and second ends 74 and 76 of the drive block 72.

The housing 80 is formed by any suitable means into the desired three sided configuration, such as by stamping, bending, etc. It should also be understood that the housing 80 may also include additional side walls extending between the first and second side walls 84 and 86 and the bottom wall 82 so as to form a closed housing with one open end.

A first aperture 90 is formed in the first side wall 84. The first aperture 90 has a diameter larger than the outer diameter of the lead screw 39 such that the lead screw 39 freely extends through the first aperture 90 without contact; but smaller than the outer diameter of the drive block 72 so as to captively retain the drive block 72 between the sidewalls 84 and 86 of the housing 80 as described hereafter.

The second side wall 86 has a second aperture 92 formed therein coaxially aligned with the first aperture 90 in the first sidewall 84. The second aperture 92 is also larger than the outer diameter of the lead screw 39; but smaller than the outer diameter of the drive block 72. As shown in FIGS. 3 and 4, the drive block 72 is coaxially aligned with the apertures 90 and 92 to form a bore extending completely through the drive block assembly 70 for receiving the lead screw 39 therethrough.

The aperture 88 formed in the bottom wall 82 is alignable with a corresponding aperture 94 formed in the base 54 of the lower track 50 as shown in FIG. 3. The aligned apertures 88 and 94 receive a fastener 96, such as a rivet, bolt, etc., to fixedly mount the housing 80 to the lower track 50. Preferably, the aperture 88 is formed by a punching operation which forms tabs 98 extending inward from the bottom wall 82 of the housing 80 and surrounding the aperture 88. The tabs 98 engage the bolt 96.

In use, the housing 80 is fixed to the base 54 of the lower track 50 by means of the fastener 96. The drive block 72 is then held in a coaxial position between the aligned apertures 90 and 92 in the first and second side walls 84 and 86 of the housing 80 for the lead screw 39 to be threaded therethrough as shown in FIG. 3. The drive block 72 should be equally spaced between the first and second side walls 84 and 86. Next, a moldable cushion is formed in the housing 80 by filling the housing 80 with a moldable resilient material 100, such as a suitable elastomeric material, rubber, etc. obviously, the sides of the housing 80 between the first and second side walls 84 and 86 are closed off during the formation of the moldable cushion 100 in the housing 80.

It will also be understood that the resilient cushion 100 can be a preformed resilient member sized to the exact inner dimensions of the housing 80 and having a through bore formed therein so as to snugly receive the drive block 72.

The resilient cushion 100 isolates the drive block 72 from the metal housing 80 and the metal lower track 50 thereby substantially eliminating any noise propagation through the drive block assembly 70 and the track assembly 48 of the power seat adjuster. Further, the resilient cushion 100 coacts with the large diameter apertures 90 and 92 formed in the first and second side walls 84 and 86 of the housing 80 to permit relative motion of the threading interconnected lead screw 39 and drive block 72 relative to the housing 70. This is possible due to the resilient or compressible nature of the cushion 100. Thus, misalignment, skewing or tolerance build up between the lead screw 39, the drive block 72, the housing 80 and the lower track 50 can be compensated.

In summary, there has been disclosed a unique drive block assembly having a particular advantageous use in a vehicle power seat adjuster. The drive block assembly includes a cushion material completely filling a housing and surrounding a drive block disposed within the housing. Any noise or vibrations generated by rotation of the metal lead screw in the metal drive block are isolated and damped by the cushion material thereby eliminating any noise propagation through the entire seat adjuster track assembly.

What is claimed is:

1. A drive apparatus comprising:

first and second members, the first member movable relative to the second member;

a threaded shaft carried with the first member;

means, coupled to the threaded shaft, for imparting rotation to the threaded shaft;

a drive block threadingly engaged with the threaded shaft;

a housing surrounding at least a portion of the drive block and fixedly mounted on the second member; and a resilient cushion cured to a solid state in the housing filling the entire housing and surrounding all of the exterior surfaces of the drive block in the housing, the cushion vibrationally isolating the drive block from the housing and the second member.

2. The drive apparatus of claim 1 wherein the cushion comprises:

a moldable resilient material.

3. The drive apparatus of claim 1 wherein the housing comprises:

a bottom wall and at least one pair of side walls extending from opposite ends of the bottom wall; and an aperture formed in each side wall for receiving the threaded shaft therethrough.

4. The drive apparatus of claim 3 wherein:

the apertures in the first and second side walls have a diameter larger than the diameter of the threaded shaft and smaller than an outer diameter of the drive nut.

5. The drive apparatus of claim 4 wherein the cushion comprises:

a moldable resilient material.

6. A seat adjuster comprising:

a lower track;

an upper track movably mounted with respect to the lower track;

a threaded lead screw rotatingly extending between the lower track and the upper track;

drive means, coupled to the lead screw, for rotating the lead screw;

a drive block threadingly engaged with the lead screw;

a housing surrounding at least a portion of the drive block and fixedly mounted on the lower track; and a resilient cushion cured to a solid state in the housing filling the entire housing and surrounding all of the exterior surfaces of the drive block in the housing, the cushion vibrationally isolating the drive block from the housing and the lower track.

7. The seat adjuster of claim 6 wherein the housing comprises:

a bottom wall and at least one pair of side walls extending from opposite ends of the bottom wall;

an aperture formed in each side wall for receiving the threaded shaft therethrough.

8. The of claim 7 wherein:

the apertures in the first and second side walls have a diameter larger than the diameter of the threaded shaft and smaller than an outer diameter of the drive nut.

9. The seat adjuster of claim 8 wherein the cushion comprises:

a moldable resilient material.

10. The seat adjuster of claim 6 wherein the cushion comprises:

a moldable resilient material.

* * * * *